United States Patent
Erickson

(12)
(10) Patent No.: US 6,203,718 B1
(45) Date of Patent: Mar. 20, 2001

(54) AQUEOUS AMMONIA CORROSION INHIBITOR

(76) Inventor: Donald C. Erickson, 1704 S. Harbor La., Annapolis, MD (US) 21401

( * ) Notice: Subject to any disclaimer, the term of this patent is extended or adjusted under 35 U.S.C. 154(b) by 0 days.

(21) Appl. No.: 09/385,617

(22) Filed: Aug. 30, 1999

(51) Int. Cl.$^7$ ............... C09K 5/04; F25B 15/04
(52) U.S. Cl. ............... 252/68; 252/69; 62/112; 422/13
(58) Field of Search ............... 252/68, 69; 62/112; 422/13

(56) References Cited

U.S. PATENT DOCUMENTS

| | | | |
|---|---|---|---|
| 2,580,983 | * | 1/1952 | Widell ............... 62/179 |
| 5,547,600 | * | 8/1996 | Downey ............... 252/68 |
| 5,548,971 | * | 8/1996 | Rockenfeller et al. ............... 62/324.2 |
| 5,725,793 | * | 3/1998 | Keller et al. ............... 252/69 |
| 5,783,104 | * | 7/1998 | Kujak ............... 252/69 |
| 5,811,026 | * | 9/1998 | Phillips et al. ............... 252/74 |

FOREIGN PATENT DOCUMENTS

96/01296  *  1/1996  (WO) .

OTHER PUBLICATIONS

McKelvy, E.C. et al. "Causes and Prevention of the Formation of Noncondensible Gases in Ammonia Absorption Refrigeration Machines", Technologic Papers of the Bureau of Standards, No. 180, Washington Oct. 25, 1920 pp. 1–10.*

Gaskell, David., "Introduction to Metallurgical Thermodynamics"., Scripta Publishing Co., Washington, D.C., 1973, p. 269.*

Cacciola, G. et al., "Theoretical Performance of an Absorption Heat Pump Using Ammonia–Water—Potassium Hydroxide Solution", Heat Recovery Syst. Chp, 1990, vol. 10, No. 3, pp. 177–185.*

Brass, M. et al., "Ammonia–Water–Lye (NAOH, KOH) as New Working Substances for Absorption Refrigerating Machines", Fortschr. Ber. VDI, Reihe 3, 1988, 544 (Technische Sorption SPRC ZESSE), pp. 280–289.*

Brass, M., "Thermophysical Material Data of Ammonia—Water Alkali (NaOH, KOH) Systems as New Working Substances for Absorption Refrigeration Processes", Forts Chr. Ber. VDI, Reihe 3, 1998, 565, 1–XIII, pp. 1–138.*

* cited by examiner

Primary Examiner—Lorna M. Douyon

(57) ABSTRACT

A corrosion-inhibited working fluid for an aqueous ammonia absorption cycle apparatus is charged with an alkali metal base in the concentration range of 0.0003 to 0.0063 moles per liter of water. A process for controlling corrosion and hydrogen generation in the aqueous ammonia absorption cycle apparatus is also disclosed.

18 Claims, No Drawings

AQUEOUS AMMONIA CORROSION INHIBITOR

BACKGROUND OF THE INVENTION

1. Field of the Invention

Corrosion inhibitors for steel absorption cycle components using aqua ammonia working fluid.

2. Description of the Related Art

Various corrosion inhibition protocols are described in the prior art which protect mild steel in $NH_3$—$H_2O$ absorption cycle service, and limit non-condensable gas formation.

McKelvy and Isaacs in Bureau of Standards Technologic Paper 180 (1920) disclosed the importance of eliminating carbonates, and also that adding 0.28 weight percent (w/o) of sodium or potassium dichromate (based on water content) stops any gas generation.

When it was later found that the chromate was depleted over time, greater amounts were added, until solubility limit problems were encountered. U.S. Pat. No. 2,580,983 disclosed provision of relatively insoluble $SrCrO_4$ or $PbCrO_4$ in tablet form, in conjunction with up to 2 w/o NaOH, to effect slow release of the chromate.

Alkali hydroxides have routinely been used for pH adjustment in conjunction with other inhibitors in LiBr absorption systems.

This has also been done in aqua ammonia absorption systems, for example, NTIS PB 95-226445 discloses 0.19 w/o NaOH plus 1 w/o sodium metasilicate as inhibitor. That amount of NaOH in the charge of distilled water produces a pH of 12.67 at 25° C. The NaOH alone was found to be at least as effective as the silicate in inhibiting the 10 w/o $NH_3$ solution.

Other investigators also advocate using alkali hydroxides as inhibiitor. U.S. Pat. No. 5,725,793 discloses alkali metal hydroxide concentrations in the range of 2 to 10 w/o (based on $H_2O$) as being effective for both corrosion inhibition and also for COP enhancement owing to reduced or eliminated need for rectification. This range of concentrations will yield pH in the range of 13.1 to 14.4 in the charged distilled water at 25° C.

U.S. Pat. No. 5,811,026 discloses inhibiting aqueous ammonia with a strong base (alkali metal hydroxide) at a concentration between 0.015 Normal and 0.2 N at 25° C., relative to the charge distilled water. This corresponds to a pH in the range of 12.2 to 13.3. The inhibitor is disclosed as effective for aqueous $NH_3$ concentrations down to about 1 w/o, although the autoclave test results reported are all at 10 w/o $NH_3$.

Modern advanced GAX cycles (U.S. Pat. Nos. 5,097,676, 5,024,063, and 5,572,885) must concentrate the water absorbent up to fairly high purity, with substantially less than 1% residual $NH_3$, in order to achieve high performance. The prior art teachings of high caustic content are found to cause excessive corrosion and non-condensable gas generation at those conditions. Hence, an improved corrosion inhibitor is needed for advanced aqua ammonia absorption cycles. Thus, the objective of this invention is to provide a corrosion-inhibited aqua ammonia solution which not only inhibits corrosion and non-condensable gas generation in the high ammonia concentration environments of prior art generators (e.g., >5 w/o $NH_3$) but also in the generators of advanced absorption cycles wherein the $NH_3$ concentration is less than 1%, and may be less than 0.1%.

DISCLOSURE OF INVENTION

The above and further useful objects are attained by supplying a carefully controlled amount of caustic as inhibitor in the aqua ammonia solution, an amount much smaller than the minimum effective amount specified in prior applications. In particular, the absorption working fluid is charged with an alkali metal base in the concentration range of 0.0003 to 0.0063 moles per liter of water. When the alkali metal base is the hydroxide, this is equivalent to adjusting the pH of the charge water to between 10.5 and 11.8 at 25° C.

Further actions or additives are disclosed for use when necessary to counteract initial use gas generation and/or very high temperature operation. In particular, the gas generation accruing during initial use is counteracted by either or both of:

- charging pure water which is de-oxygenated and de-carbonated;
- pre-oxidizing the steel apparatus to establish the desired $Fe_3O_4$ film.

Very high temperature (>160° C.) corrosion is further counteracted by very small additions of chromate and/or $G_eO_2$.

DETAILED DESCRIPTION OF THE INVENTION

The key to preventing corrosion and harmful non-condensable gas generation in steel aqua absorption cycle components is to establish and preserve a protective film of $Fe_3O_4$. According to the well-known Ellingham diagram, this requires that the solution $pO_2$ be kept below $10^{-37}$ atmospheres absolute (ATA) (at 200° C.). Equivalently, the $pH_2/pH_2O$ ratio must be kept above $10^{-6}$, in order to preserve that low $pO_2$, but otherwise as low as possible, to keep $pH_2$ below the solubility limit. This is done indirectly by introducing buffering compounds, in particular strong bases.

The following stoichiometries are present in aqueous ammonia solutions buffered by alkali metal bases:

1) $NH_3 + H_2O =$     $NH_4OH$
2) $H_2O =$     $H^+ + OH^-$
3) $NH_3 =$     $NH_2^- + NH_4^+$
4) $NH_4OH =$     $NH_4^+ + OH^-$
5) $MOH =$     $M^+ + OH^-$
6) $MNH_2 =$     $M^+ + NH_2^-$
7) $OH^- + NH_3 =$     $NH_2^- + H_2O$
8) $2NH_3 + H_2O =$     $(NH_4)_2O$
9) $N_2 + 3H_2 =$     $2NH_3$
10) $2H_2 + O_2$     $2H_2O$
11) $3Fe + 4H_2O =$     $Fe_3O_4 + 4H_2$
12) $Fe_3O_4 + 2H_2O + H_2 =$     $3Fe(OH)_2$

While not desiring to be bound by any particular theory, the following explanation can be inferred from the complex chemical equilibrium derived from these equations plus observed results. First, in the absence of any caustic inhibitor, the ammonium concentration (equation 4) and hydronium (equation 2) cause $pO_2$ to be in the range where the $Fe_3O_4$ film will form (equation 11), but at higher than desired $pH_2$; (i.e., $pH_2$ higher than the solubility limit). As generated $H_2$ is carried away, additional corrosion occurs to maintain the $pH_2$ dictated by the ammonium and hydronium concentrations. Second, as inhibitor is added (M=alkali metal), the increase in hydroxide ion concentration causes hydronium to decrease (equation 2) and the increase in amide ion concentration causes ammonium to decrease (equation 3). Thus, $pH_2$ decreases, with essentially no change in $pH_2O$, and hence $H_2$ generation rate decreases.

However, if too much caustic is added, a new problem arises, even before $pO_2$ reaches the value where $Fe_2O_3$ forms ($10^{-37}$ ATA). That problem is the formation of iron hydroxide (equation 12), a non-protective porous film which may be carried away or dissolved. This exposes new base metal to corrosion, and hence increases $H_2$ generation rate. The conditions wherein iron hydroxide forms can be approximated from the well-known Pourbaix diagram.

Thus, there is an optimum level of caustic (strong base) which preserves the $Fe_3O_4$ film while minimizing $H_2$ generation, i.e., minimizing the ongoing rate of corrosion. For pure water in the 200° C. temperature range, that level has been found to be between 0.001 and 0.0001 moles of caustic per liter of water. This corresponds to a pH between 11 and 12, measured at 25° C. For pure water, caustic concentrations either above or below this concentration cause higher corrosion rates and corresponding $H_2$ generation rates.

Based on prior reports cited above, when $NH_3$ is added to pure water, the amount of caustic tolerated by the solution increases. Apparently, the harmful effect of excess hydroxide ion is counteracted, either by coexistence of new species ($NH_3$, $NH_4OH$, etc.) or by the amide ion actually reducing the hydroxide ion concentration (equation 7). For whatever reason, the $NH_3$ containing solution is reported to tolerate pH values from 12.2 to 14.4 (10 w/o $NH_3$ or more).

What applicant has discovered, and contrary to the teachings of the prior applications which recite a minimum pH of 12.2, is that a pH as low as 11 (or 10.5 in many cases) confers the same level of protection to ammonia containing solutions. This is fifteen times less inhibitor, i.e., a concentration of 0.001 mole per liter (pH=11) in comparison to the 0.015 moles per liter minimum specified in the prior applications.

The significant point of this lower concentration is that it thereby avoids the problems encountered with compositions taught in prior applications when applied in advanced absorption cycles, wherein the ammonia concentration is close to zero in parts of the generator.

Two things happen in absorption cycle generators which cause local concentrations of caustic to be appreciably higher than the average concentration. First is the distillation action of the boiling process—pure water vapor and ammonia vapor depart, leaving the caustic behind in a reduced amount of water. Second is the problem of local hot spots or chemical hideout, where further concentration can occur. Accordingly, to ensure that the caustic concentration nowhere exceeds the 0.01 mole per liter limit beyond which the corrosion rate will increase in the absence of appreciable ammonia, the charge concentration is limited to a value no larger than 0.0063 moles per liter maximum (pH=11.8).

In summary, limiting the alkali metal base inhibitor concentration to the range of 0.0003 to 0.0063 moles per liter of charged water (pH 10.5 to 11.8) has been found to confer at least as good inhibition as the minimum inhibitor concentrations specified in prior applications (ten to one-hundred times greater than this range) in conventional aqua absorption apparatus, and far superior inhibition in advanced apparatus wherein generator ammonia concentrations well below 1% are encountered.

The conventional alkali metal base (i.e., caustic) used for this inhibition duty is NaOH. However, any alkali metal hydroxide (or mixture thereof) can be substituted since all undergo essentially complete ionization in solution. Alternatively, any alkali metal amide can also be used—the same solution results irrespective of starting with amides or hydroxides, in accordance with equation 7. However, the ratio of hydroxide ion to amide ion will vary with the selected cation.

For example, using sodium cations, a solution having 0.003 moles per liter caustic (equivalent to pH=11.5) can be prepared by adding 0.003 moles of NaOH (0.12 gm) to each liter of water, or by adding 0.003 moles $NaNH_2$ (0.117 gm), or any linear combination of the two.

It has been observed that whereas the solutions containing between 0.0003 and 0.0063 moles of alkali metal base per liter eventually reach $H_2$ generation rates lower than the more concentrated caustic solutions, their initial $H_2$ generation rate is higher. This is theorized to be due to the mechanism involved in initial formation of the $Fe_3O_4$ film, and also the thickness of the film. If this high initial generation rate would be a problem, e.g., in a sealed system with no simple means of $H_2$ removal, it has been found that it can be avoided by pre-oxidizing the inside surfaces of the apparatus. This is done by heating the apparatus in a controlled low $pO_2$ atmosphere to a temperature in the range of 400° C. to 500° C. for approximately 30 minutes. The low $pO_2$ is advantageously controlled by maintaining a substantial vacuum in the apparatus while introducing a slight bleed of air into it. Other pre-oxidation techniques as described in the prior art such as U.S. Pat. No. 5,806,337 for LiBr apparatus may also be applied to the $NH_3$—$H_2O$ apparatus.

Another technique for limiting the harmful effects of initial $H_2$ generation is to include excess $N_2$ in the initial charge sufficient to react with the $H_2$ to form $NH_3$.

If the charge water is air-saturated, it should be de-oxygenated and de-carbonated prior to use. As indicated above, dissolved $N_2$ is usually not detrimental. Therefore, one good technique for degassing the water is to sparge it with nitrogen. Dissolved $CO_2$ is harmful both because of the corrosion it causes and also because it consumes hydroxide. Many other water impurities are also detrimental—halogen salts, sulfur compounds, carbonates, etc.—and should be excluded when necessary by either distillation or demineralization.

Controlling the caustic content of aqua ammonia solutions within the specified range confers adequate corrosion protection up to temperatures of 170° C. to 190° C. Above that, some additional help is needed from other inhibitors. Small amounts of alkali chromate, between 0.05 and 0.3 w/o, provide additional inhibition. Other helpful inhibitors, not as effective as chromate but also not toxic, include alkali molybdate, alkali tungstate, and gemanium dioxide. The tungstate and molybdate are effective at concentrations of about 0.5 w/o, whereas a solubility constraint limits $GeO_2$ to about 500 ppm. A similar constraint applies to the use of this inhibitor LiBr applications (U.S. Pat. No. 5,783,104).

What is claimed is:

1. A corrosion-inhibited working fluid for an aqueous ammonia absorption cycle apparatus comprises ammonia, water, and alkali metal base at a concentration in the range of 0.0003 to 0.0063 moles per liter of water.

2. The working fluid according to claim 1 wherein the alkali metal base is an alkali metal hydroxide, alkali metal amide, or mixtures thereof.

3. The working fluid according to claim 2 wherein the water is distilled, de-oxygenated, and de-carbonated.

4. The working fluid according to claim 2 wherein the water is de-mineralized.

5. The working fluid according to claim 2 additionally comprises between 0.05 and 0.3 weight percent, based on water, alkali metal chromate.

6. The working fluid according to claim 2 additionally comprises approximately 500 ppm $GeO_2$.

7. The working fluid according to claim 2 additionally comprises approximately 0.5 weight percent of at least one of alkali molybdate and alkali tungstate.

8. A method of inhibiting corrosion and the formation of hydrogen in a steel absorption refrigeration, air conditioning, or heat pump apparatus using an aqueous ammonia working fluid under anaerobic conditions at temperatures up to about 190° C., comprising introducing to the aqueous ammonia working fluid an alkali metal base in an amount effective to produce a concentration in water prior to the addition of ammonia in the range of about 0.0003 to 0.0063 moles per liter of water at 25° C.

9. The method of claim 8 wherein the alkali metal base is at least one of NaOH, LiOH, KOH, RbOH, and CsOH.

10. The method of claim 8 wherein the alkali metal base comprises at least in part an alkali metal amide.

11. The method of claim 10 wherein the alkali metal base is $NaNH_2$.

12. The method of claim 8, additionally comprising pre-oxidizing said apparatus.

13. The method of claim 8, additionally comprising distilling, de-oxygenating, and de-carbonating said water prior to addition of said base.

14. The method of claim 8, additionally comprising adding about 500 ppm $GeO_2$ as supplemental inhibitor.

15. The method of claim 8, additionally comprising adding at least one of alkali chromate, alkali molybdate, and alkali tungstate as supplemental inhibitor.

16. A process for controlling corrosion and $H_2$ generation in an aqueous ammonia absorption cycle apparatus comprising:

a) pre-oxidizing said apparatus so as to form an $Fe_3O_4$ (ferroso-ferric oxide) film;

b) supplying pure water which is de-oxygenated and de-carbonated as charge together with ammonia to said apparatus; and c) adding alkali metal base to said water to a concentration between 0.0003 and 0.0063 moles per liter of water.

17. The process according to claim 16 wherein said alkali metal base is at least one of NaOH and $NaNH_2$.

18. The process according to claim 16 additionally comprising adding about 500 ppm $GeO_2$ to said water.

\* \* \* \* \*